UNITED STATES PATENT OFFICE.

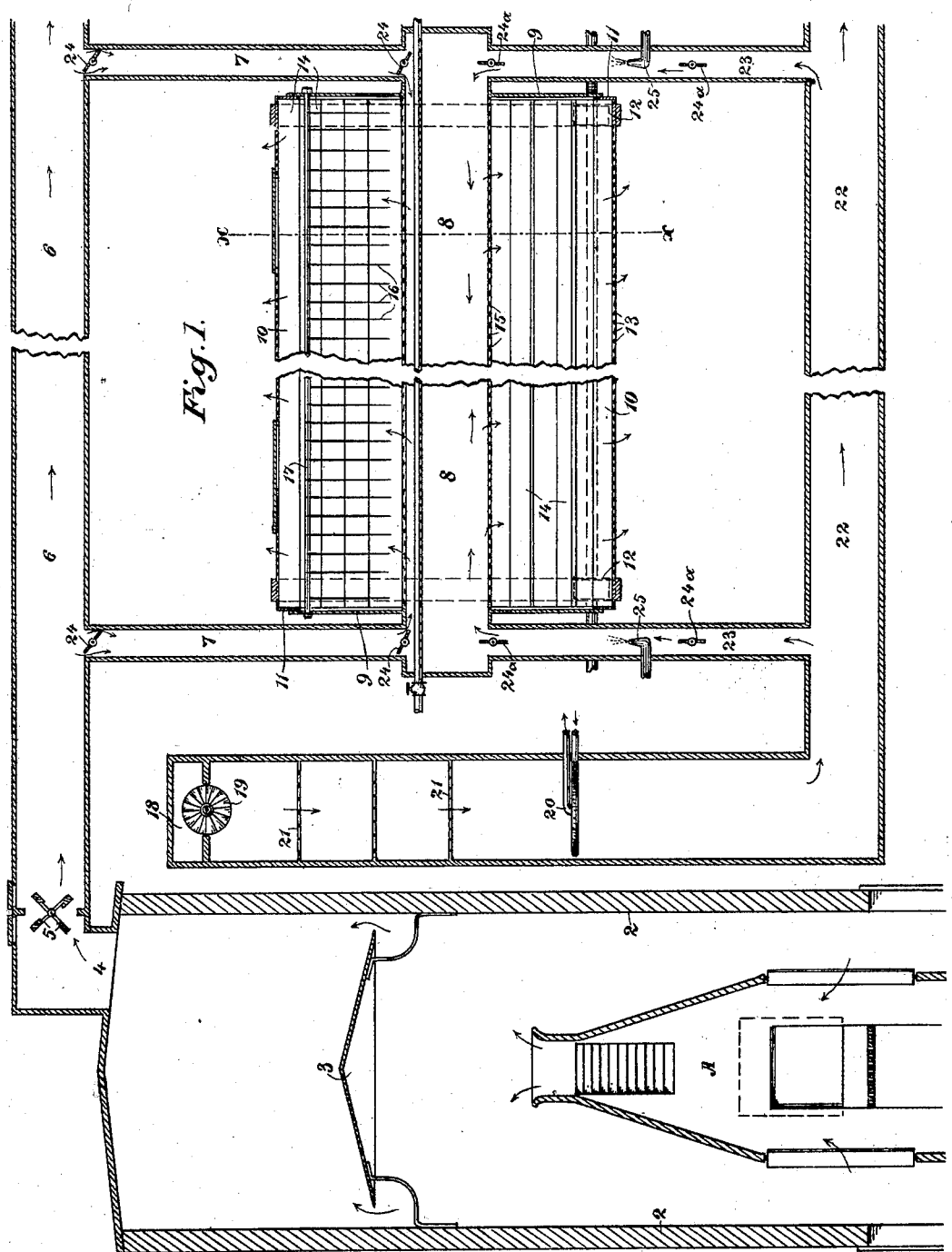

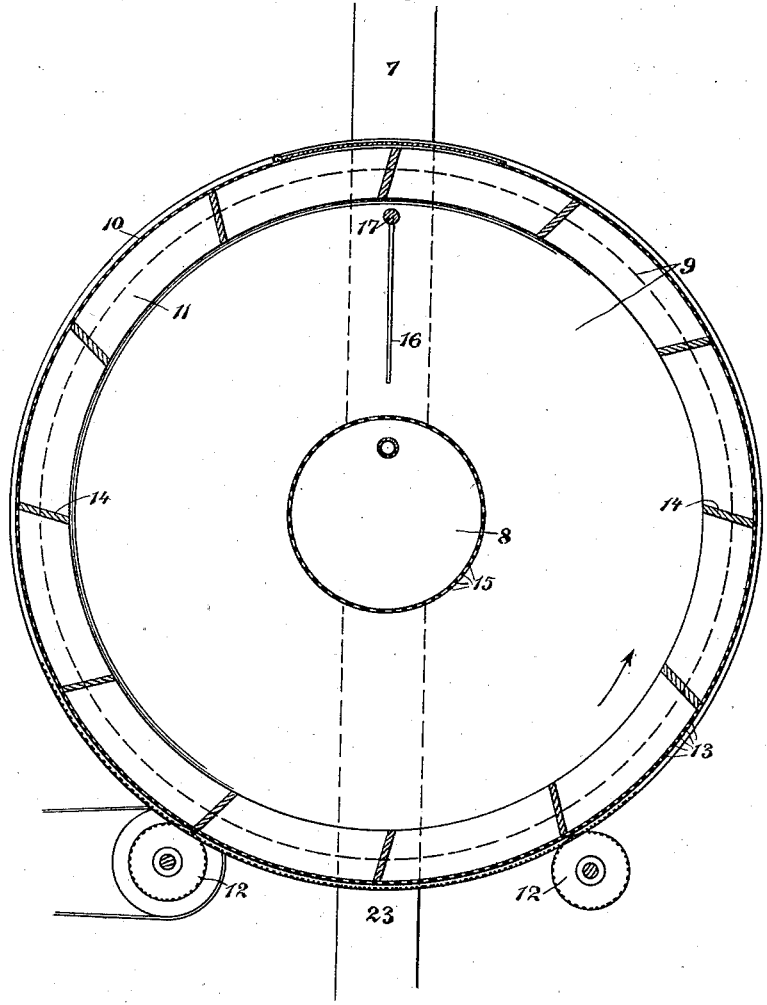

BERNARD BERG, OF SAN FRANCISCO, CALIFORNIA.

MALTING APPARATUS.

SPECIFICATION forming part of Letters Patent No. 685,904, dated November 5, 1901.

Application filed November 10, 1900. Serial No. 36,095. (No model.)

*To all whom it may concern:*

Be it known that I, BERNARD BERG, a citizen of the United States, residing in the city and county of San Francisco, State of California, have invented an Improvement in Malting Apparatus; and I hereby declare the following to be a full, clear, and exact description of the same.

My invention relates to an apparatus which is designed for the preparation of malt and the like.

It consists of an air-heating furnace, means for transmitting the air thus heated and preventing the passage of soot and dust, one or more chambers within which the malt is contained, means for agitating the malt therein, means for delivering the heated air into said chambers, a moistening and cooling apparatus, and means for delivering the air therefrom into the chamber.

My invention also comprises details of construction, which will be more fully explained by reference to the accompanying drawings, in which—

Figure 1 is a central longitudinal section through the apparatus. Fig. 2 is a lateral section on line *x x* of Fig. 1.

The object of my invention is to provide an apparatus by which malt employed for brewing and the like can be rapidly germinated and the germination afterward checked. Of the four operations of malting, consisting of steeping, couching, flooring, and kiln-drying, this invention is especially designed to carry out the last three.

As shown in the accompanying drawings, A is a furnace or heater of any suitable description, and by means of this furnace air is heated. The air is admitted through suitable gates, valves, or passages to enter the furnace, the latter being contained within an exterior structure, as 2, and the air which is heated arises through the top of the furnace. Above the furnace is supported a hood 3, into which the body of air as it rises will pass, and this hood serves to check any dust or soot which may arise with the air and cause it to be deposited. The periphery of the hood 3 is located a short distance from the interior of the chamber 2, and this chamber is connected by a pipe 4 with an air-forcing apparatus 5. This apparatus withdraws the air from the heating-chamber and delivers it into a pipe or passage 6 of sufficient capacity, and the air thus heated is taken from this passage at intervals by conducting-passages 7. These passages connect with horizontally-supported central chambers 8. Through the upper portions of the chamber extends a perforated pipe 8'. At a sufficient distance apart and fixed to these chambers are disks 9, which form the heads of revoluble cylinders. These cylinders or casings 10 have flanges 11 at the ends, which extend inwardly and overlap the disk 9, so as to form joints therewith. The disks are stationary with the chamber 8, and the cylinders or casings 10 are mounted upon pulleys or rollers 12, which support them in their relative positions with the stationary disks and at the same time allow power to be applied to revolve the cylinders. These cylinders have openings through which the material to be malted is introduced, and the cylinders are thus charged. The outside surfaces of these cylinders have slits made through them, as shown at 13, for the free passage of air, but without allowing the material to pass. The interior surfaces of the cylinders have flanges or lifters 14, so arranged that as the cylinders are revolved these lifters will take up a portion of the material, carry it up to the top, and then spread it out, so that it falls downwardly upon the central chamber 8, and this chamber is also perforated with small holes or slits, as shown at 15, for the escape of the air which has been admitted into the cylinder. Thus the material falling through the air upon this cylinder is subdivided and loosened up, so that the heated air can pass through the whole mass.

In order to prevent the material from adhering together in balls or masses, I have shown rakes or teeth, as at 16, fixed to a bar 17, which extends from end to end between the disks 9, and these teeth extend downwardly from the supporting-bar to near the top of the central chamber 8. The material is continually passed between these teeth, and thus broken up and prevented from forming masses. It is necessary that a certain temperature be maintained within these chambers until the moist material has been sprouted or germinated, after which the process is arrested and the material is in condition for the final step.

In order to provide means for regulating or changing the temperature within the chambers, I have shown a supplemental chamber 18, having an air-forcing mechanism 19, by which air is introduced. This air is carried through any cooling material. If an ice or refrigerating machine is available, coils, as at 20, may be employed to cool the air. If this is not available, the air may be passed through ice supported upon perforated floors, as at 21, and thus cooled and moistened. The air from this passes through a main 22, having passages 23 leading therefrom to opposite ends of each of the chambers 18. Valves, as at 24, control the supply of heated air, and valves at 24$^a$ control the supply of the cold air to this chamber, and the air may be mixed within the chamber, as desired, to produce any required temperature. The moist and properly-tempered air is first introduced until the process of germination has reached the desired point. The cooler air is then cut off and hot air is introduced to arrest the germination and dry the malt to complete the operation.

In order to properly moisten the air which is introduced through the passages 23, I have shown spray-pipes 25, through which water may be injected with the air. This provides the necessary moisture to germinate the grain, and the temperature is regulated by mixing the hot and cold air from the different sources of supply.

When the grain has been properly germinated or sprouted and the germination arrested by the drying-heat afterward applied, the malt is ready for ordinary use; but it has been found difficult to keep it or ship it on account of the tendency to reabsorb moisture. The object of the steam-pipe 8' is to allow the surface of the malt to be slightly moistened after it has been dried and then the hot air again turned on to dry this surface moisture, and this forms a sort of crust upon the outside of the malt which has proved very effective in preventing this reabsorption of moisture.

Having thus described my invention, what I claim as new, and desire to secure by Letters Patent, is—

1. The combination with a malting-drum and a cylinder located centrally therein, of a hot-air main and branches therefrom exterior to the drum and one leading to each end of said drum, and valves in said branches whereby the air may be admitted to one or both ends of the drums or the supply of hot air to cylinder entirely cut off.

2. The combination with a malting-drum and a cylinder located centrally therein, of a cold-air main and branches therefrom exterior to the drum and one leading to each end of the cylinder, and valves in said branches whereby the cold air may be admitted to one or both ends of the cylinder, or the cold-air supply cut off.

3. The combination with a malting-drum, and a cylinder located centrally therein, of a hot-air main, a cold-air main, branches from each main, said branches being exterior to the drum and leading to both ends of the cylinder, and valves in said branches whereby either hot or cold air or admixture of the two may be admitted to the cylinder.

4. The combination with a malting-drum and a cylinder located centrally therein and having closed ends, of an air trunk or main and branches therefrom exterior to the drum and leading to the cylinder, valves in said passages controlling the admission of air to the cylinder, and spray devices in the branches for moistening the air passing through the latter.

5. The combination with the drum and the cylinder therein and closed at both ends, of a hot-air furnace, a main leading therefrom, branches from the main, said branches being exterior to the drum and leading to each end of the cylinder, valves in the branches for controlling the admission of air to the cylinder, a hood in the furnace and intercepting the products of combustion, and an air-forcing mechanism between the furnace and the cylinder.

6. The combination with the drum and the cylinder therein, of a hot-air supply, a supplemental cold-air chamber and an air-forcing mechanism for forcing air therethrough, a main connecting with the supplemental chamber and branches from said main, said branches being exterior to the drum and leading one to each end of the cylinder, and valves in said branches and in the hot-air supply whereby hot or cold air or an admixture of the two may be admitted to the cylinder.

7. In a malting apparatus, the combination of the malting-drum with narrow slits in its outer surface; a cylinder centrally within the drum and having narrow slits; and valve-controlled hot and cold air trunks or passages exterior to the drum and connecting with opposite ends of the cylinder whereby either hot or cold air or an admixture of the two may be admitted to either or both ends of the cylinder, and means for agitating the malt in the drum.

8. In a malting apparatus, the combination of a foraminous malting-drum and a foraminous cylinder within the same; air purifying and attemperating passages exterior to the drum and communicating with both ends of the cylinder; valves in said passages and controlling the air-currents; and a stationary bar extending between opposite ends of the drum above the cylinder, and having fingers projecting downwardly to near the surface of the cylinder, and adapted to effect a gentle separation of the malt at substantially the point of least agitation.

In witness whereof I have hereunto set my hand.

BERNARD BERG.

Witnesses:
L. H. NOURSE,
CHAS. E. TOWNSEND.